United States Patent
Mukasa et al.

(10) Patent No.: US 6,849,821 B2
(45) Date of Patent: Feb. 1, 2005

(54) LASER WELDING HEAD-CONTROLLING SYSTEM, A LASER WELDING HEAD AND A METHOD FOR CONTROLLING A LASER WELDING HEAD

(75) Inventors: Koichi Mukasa, Hokkaido (JP); Masayuki Ikeda, Hokkaido (JP); Kazuhisa Sueoka, Hokkaido (JP); Eisuke Ueda, Hokkaido (JP); Hisao Kadono, Hokkaido (JP); Masakazu Mutoh, Hokkaido (JP)

(73) Assignee: Hokkaido University, Hokkaido (JP)

( * ) Notice: Subject to any disclaimer, the term of this patent is extended or adjusted under 35 U.S.C. 154(b) by 0 days.

(21) Appl. No.: 09/851,261

(22) Filed: May 8, 2001

(65) Prior Publication Data

US 2002/0003129 A1 Jan. 10, 2002

(30) Foreign Application Priority Data

May 11, 2000 (JP) .................................. 2000-138283

(51) Int. Cl.⁷ ............................ B23K 26/00; B23K 9/12
(52) U.S. Cl. ............................. 219/121.63; 219/121.64
(58) Field of Search ..................... 219/121.63, 121.64, 219/121.83; 356/376, 604

(56) References Cited

U.S. PATENT DOCUMENTS

| | | | |
|---|---|---|---|
| 4,491,719 A | | 1/1985 | Corby, Jr. |
| 4,578,561 A | | 3/1986 | Corby, Jr. |
| 5,104,216 A | | 4/1992 | Volurka |
| 5,380,978 A | | 1/1995 | Pryor |
| 5,533,146 A | * | 7/1996 | Iwai ............................ 382/150 |
| 5,739,912 A | * | 4/1998 | Ishii ............................ 356/376 |
| 5,910,894 A | | 6/1999 | Pryor |
| 5,938,446 A | * | 8/1999 | Anderson et al. ........... 433/223 |

FOREIGN PATENT DOCUMENTS

| | | | |
|---|---|---|---|
| EP | 0 108 599 A1 | | 5/1984 |
| EP | 0 452 138 A2 | | 10/1991 |
| EP | 0 822 389 A2 | | 2/1998 |
| JP | 61-38785 | * | 2/1986 |
| JP | 4-52078 | * | 2/1992 |
| JP | 4-55078 | | 2/1992 |
| JP | 5-337662 | | 12/1993 |
| JP | 7-51869 | | 2/1995 |
| JP | 8-285524 | | 11/1996 |
| JP | 9-248687 | * | 9/1997 |
| JP | 11-254167 | | 9/1999 |
| JP | 2000-42769 | | 2/2000 |

OTHER PUBLICATIONS

U.S. Appl. No. 09/850,839, filed May 8, 2001, Koichi Mukasa et al.
U.S. Appl. No. 09/850,828, filed May 8, 2001, Koichi Mukasa et al.

* cited by examiner

Primary Examiner—Kiley S. Stoner
Assistant Examiner—Len Tran
(74) Attorney, Agent, or Firm—Knobbe Martens Olson & Bear, LLP

(57) ABSTRACT

A laser irradiating body with a laser inlet and a laser outlet is provided, and plural semiconductor lasers to oscillate plural linear laser beams for measuring a welding state are provided. Then, a CCD camera with a band-pass filter therein to pass through only the reflected linear laser beams is provided. The CCD camera takes, as an image, the measured welding state by the reflected linear laser beams in. Moreover, an image processor to process the image of the measured welding state is provided.

14 Claims, 2 Drawing Sheets

LASER WELDING HEAD-CONTROLLING SYSTEM, A LASER WELDING HEAD AND A METHOD FOR CONTROLLING A LASER WELDING HEAD

BACKGROUND OF THE INVENTION

1) Field of the Invention

This invention relates to a laser welding head-controlling system, a laser welding head and a method for controlling a laser welding head.

2) Description of Related Art

A laser welding technique is suitable for fabricating an ultrahigh-vacuum apparatus composed of high precise processed parts made of a steel material. Recently, in the laser welding technique, a YAG (yttrium-aluminum-garnet) laser is widely used. The welding technique using the YAG laser has the following advantages: First, since the laser beam from the YAG laser is absorbed to parts to be welded of members to be welded made a metallic material effectively, the welding process can be carried out efficiently. Second, since the laser beam can be transmitted by an optical fiber, the laser welding head can be mounted on a three-dimensional welding apparatus or a steel-collar worker. Third, since a condenser and a laser beam-penetrating window can be made of quartz, they are safe at their destruction and can made in low cost.

On the other hand, the laser welding technique requires high precision in positioning the laser beam spot for realizing a high precise welding process. The latitude of the positioning operation is within 10% of the thickness of the members to be welded or 50% of the spot diameter of the laser beam. Since the spot diameter of the above laser beam is generally 1 mm or below in the welding process, the positioning precision of not more than 0.2 mm is required if the focused spot diameter is about 0.5 mm. Therefore, in this case, the welding laser head is controlled and traced along a welding line (seam line) so that the laser beam can be irradiated onto the parts to be welded at a precision of not more than 0.2 mm.

For realizing the above precise welding operation, parts constituting the laser welding head are made precisely, and positioning jigs and positioning sensors are mounted on the laser welding head.

However, the above conventional laser welding head becomes large in size and high in cost since it has the above complicate structure.

Moreover, a welding process using a CCD camera has been studied and suggested. In the welding process, the laser welding head is traced along a seam line on the monitored image by the CCD camera. However, as of now, the welding process is not generally employed because the CCD camera does not represent sufficient resolution.

In the case of joining the members to be welded densely, the space between the members becomes almost zero, so that the CCD camera can not detect the space as light and shade images. Moreover, since, for shortening the image processing period, an input image having 256 black and white gradations is needed, it may suffer from light reflection and flaws on the surfaces of the members to be welded made of a metallic material.

Although it is tried in many field to perform the welding process and the image processing at real time, the image processing is generally carried out prior to the welding process due to the slow image processing speed and the high welding process speed. That is, as of now, it is impossible to perform the welding process and the image processing at real time.

Moreover, since the welding process using the CCD camera requires a given space between the CCD camera and the members to be welded for monitoring the welding state of the members, the laser welding head having the CCD camera can not be downsized.

SUMMARY OF THE INVENTION

It is an object of the present invention to provide a laser welding head-controlling system, a laser welding head and a method for controlling a laser welding head to iron out the above matters.

For achieving the above object, this invention is directed at a laser welding head-controlling system comprising:

a laser irradiating body with a laser inlet and a laser outlet, plural semiconductor lasers to oscillate plural linear laser beams for measuring a welding state, a CCD camera with a band-pass filter therein to pass through only the reflected linear laser beams to take in, as an image, the measured welding state by the reflected linear laser beams, and an image processor to process the image of the measured welding state.

Moreover, this invention is directed at a laser welding head comprising the above laser welding head-controlling system, a laser oscillator to oscillate a laser for welding and a condenser to converge the oscillated laser.

And then, this invention is directed at a method for controlling a laser welding head comprising the steps of:

irradiating plural linear laser beams for parts to be welded of members to be welded to measure a welding state from plural semiconductor lasers, taking, as an image, the measured welding state by the reflected linear laser beams into a CCD camera, processing the image of the measured welding state, and controlling a laser welding head based on the processed data of the image.

According to the present invention, the laser welding head can be downsized and made in low cost. Moreover, the welding process can be performed precisely and easily by using the downsized and small laser welding head.

The other objects, configurations and advantages will be explained in detail, with reference to the attaching drawings.

BRIEF DESCRIPTION OF THE DRAWINGS

For better understanding of the present invention, reference is made to the attached drawings, wherein.

DESCRIPTION OF THE PREFERRED EMBODIMENTS

This invention will be described in detail with reference to figures.

Figure 1:
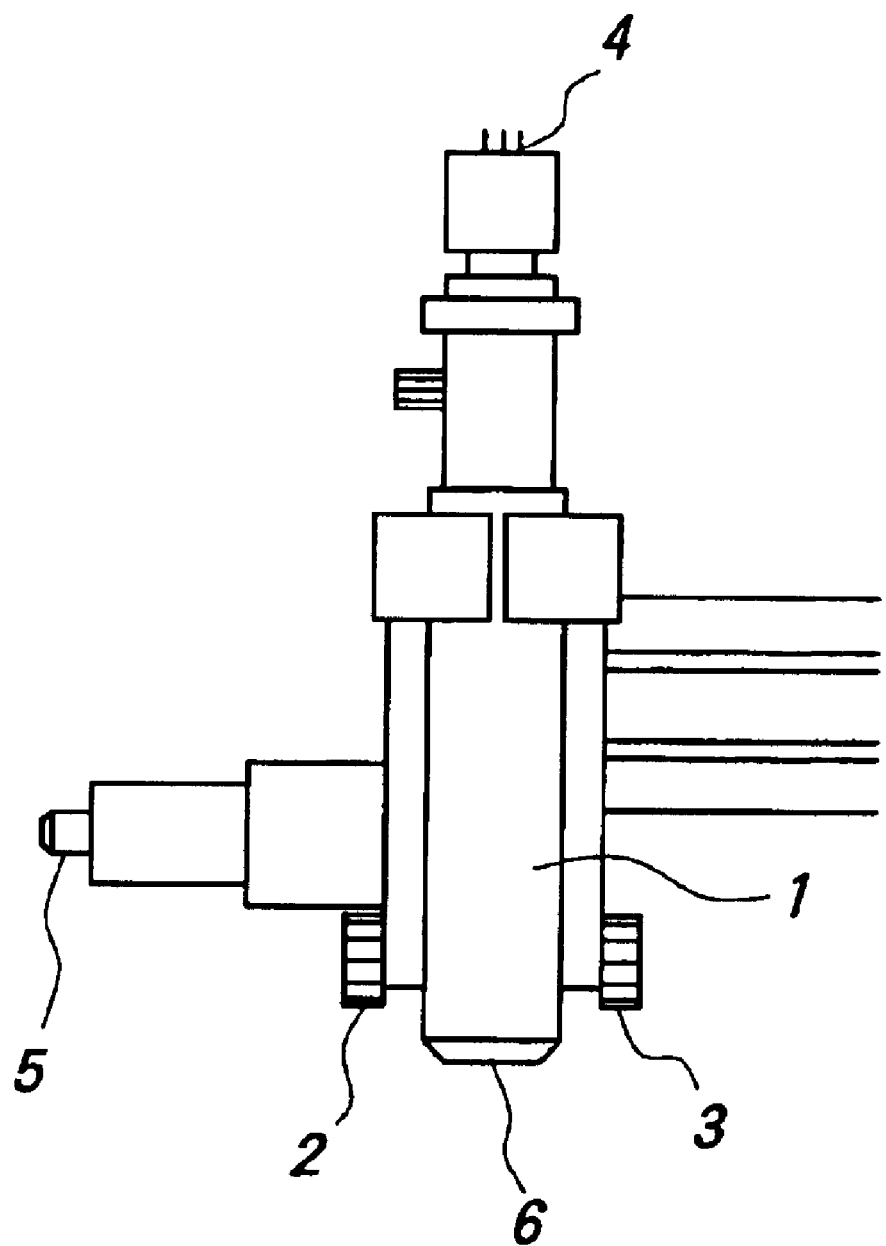
FIG. 1 is a structural view showing a laser welding head-controlling system according to the present invention.

FIG. 1 is a structural view showing a laser welding head-controlling system according to the present invention. The laser welding head-controlling system has a laser irradiating body 1 with a YAG laser inlet 5, a YAG laser outlet 6, semiconductor laser apparatus 2 and 3, and a CCD camera 4.

A laser emitted from a YAG laser (not shown) as a laser oscillator provided on a laser welding head is converged by a condenser (not shown), and introduced into the YAG laser inlet 5, and then, emitted from the YAG laser outlet 6 and irradiated onto parts to be welded of members to be welded. The semiconductor laser apparatus 2 and 3, for example, irradiate linear laser beams at an oblique direction of 45 degrees for the parts to be welded, respectively, so that the irradiated laser beams can be orthogonal to the seam line of the parts to be welded. The CCD camera 4 is directed at the parts to be welded to take a photograph of the state of the parts to be welded. The CCD camera 4 has a band-pass filter therein to pass through only the above linear laser beams. Therefore, the CCD camera 4 can take the photograph of the state of the parts to be welded by the reflected linear laser beams at the part to be welded without the disturbance of an outside light and a welding laser. The image taken in the CCD camera 4 is transmitted to an image processor (not shown), and is processed in image to determine the distance the between the two linear laser beams, the relative and absolute positions of the two linear laser beams, the line width and the shape of each linear laser beam.

Figure 2:
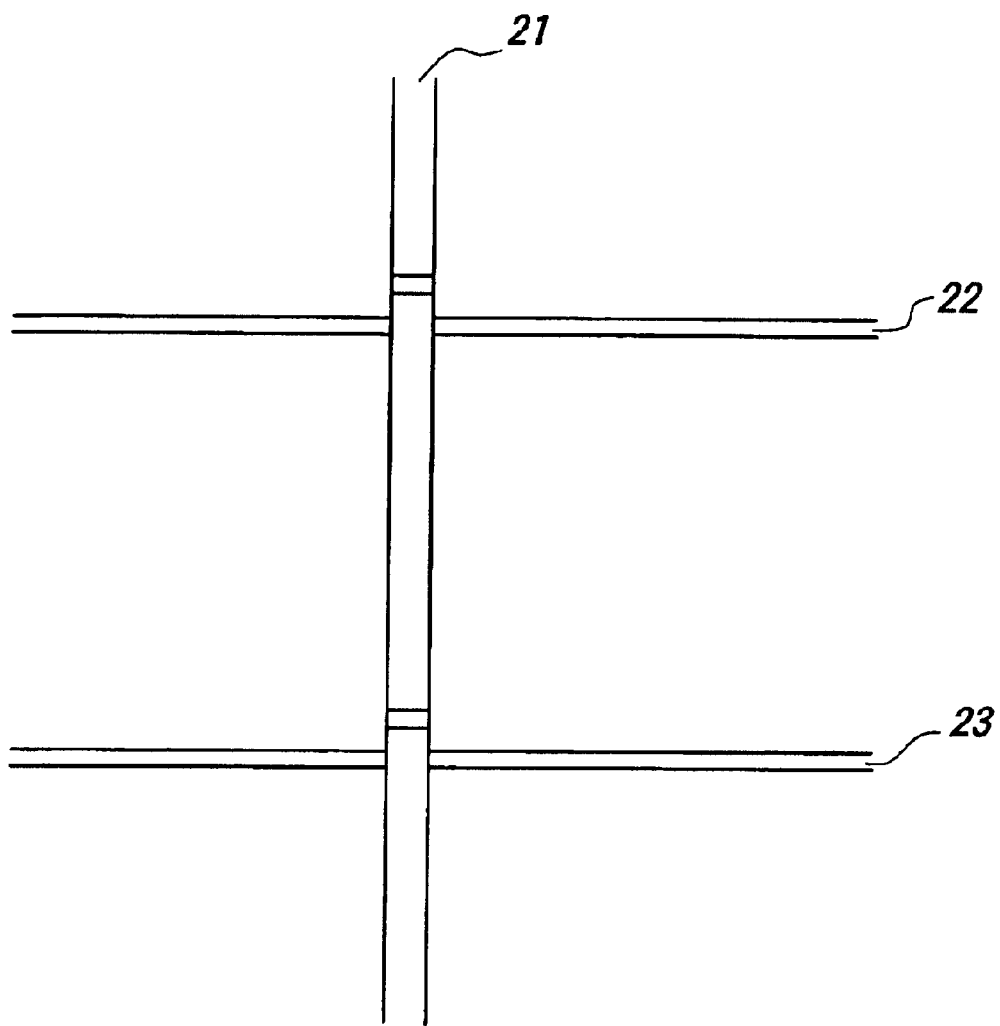
FIG. 2 is a top plan view showing the state in which a welding process is being carried out onto the members to be welded, according to the present invention.

FIG. 2 is a top plan view showing the state in which the welding process is being carried out onto the members to be welded. When two linear laser beams 22 and 23 are irradiated onto the members to be welded, they are disconnected at a seam line 21. When the photograph of the above state is taken by the CCD camera 5, and the thus obtained image is processed, the cross points between the seam line 21 and the line lasers 22, 23 are calculated. If the seam line 21 is linear, the position of the seam line is determined by the cross points. Moreover, due to the oblique irradiation of the line lasers, the inclinations of the parts to be welded are determined by the line widths of the linear laser beams, and the heights of the parts to be welded are determined by the absolute position of each linear laser beam. In this way, the shapes, the inclinations, the heights and the positions of the parts to be welded of the members to be welded and the position of the seam line are determined by the distance between the two linear laser beams, the relative and the absolute positions of the two linear laser beams, and the line width and shape of each linear laser beam.

In the welding process using the laser welding head, it is desired that the shapes and sizes of the parts to be welded of the members to be welded are calculated and monitored by their CAD data and the absolute position and angle of the parts to be welded are monitored by the above image-processing. In this case, the laser welding head is controlled so as to trace the seam line on the monitored data. The use of the CAD data enables the image introduced from the CCD camera 4 to be precisely processed at a high speed. As a result, the welding process period is shortened, and more, the reproducibility and reliability of the welding process can be developed. Therefore, if at least one of the members to be welded has a complicate shape such as a sphere shape or a cylindrical shape, they can be precisely welded each other.

Although the present invention was described in detail with reference to the above examples, this invention is not limited to the above disclosure and every kind of variation and modification may be made without departing from the scope of the present invention. For example, on the above monitored data, welding defects can be monitored. Moreover, three or over line laser may be employed in the above operation.

What is claimed is:

1. A laser welding head-controlling system comprising:

a laser irradiating body with a laser inlet and a laser outlet that directs a laser spot at a welding seam, a plurality of semiconductor lasers to oscillate a plurality of linear laser beams configured to direct said plurality of the linear laser beams at welding seam or at a region already welded for measuring a welding state during or after a welding process, a CCD camera with a band-pass filter therein to pass through only reflected laser beams from said linear laser beams and to take in, as an image, said welding state, and an image processor to process said image relating to said welding state.

2. A laser welding head comprising a laser welding head-controlling system as defined in claim 1, a laser oscillator to oscillate a laser for welding and a condenser to converge the oscillated laser.

3. A method for controlling a laser welding head comprising the steps of:

irradiating a plurality of linear laser beams onto parts during or after a welding process to detect a welding state of the parts, taking, as an image, said welding state on laser beams reflected by the parts into a CCD camera, processing said image relating to said welding state, and controlling a laser welding bead based on process data relating to said image.

4. A method for controlling a laser welding head as defined in claim 3, wherein the laser welding head is controlled by the CAD data of the parts to be welded.

5. A method for controlling a laser welding head as defined in claim 3, further comprising the step of monitoring welding defects of the parts to be welded based on the process data and the CAD data.

6. A method for controlling a laser welding head as defined in claim 4, further comprising the step of monitoring welding defects of the parts to be welded based on the process data and the CAD data.

7. A laser welding head-controlling system for controlling the position of a laser welding head with respect to a target area of objects to be welded, comprising:

at least two semiconductor lasers for emitting linear laser beams configured to be crisscrossed over a seam line at a predetermined angle at the target area or at a region already welded for detecting a welding state during or alter a welding process;

a CCD camera provided with a band-pass filter, through which linear laser beams reflected by the object pass exclusively, to generate an image or the target area; and an image processor for processing the image of the target area to determine the progress of welding, thereby controlling the position of a laser welding head.

8. The laser welding head-controlling system according to claim 7, further comprising a CAD data system which stores CAD data of the objects, said data being used to control the position of the laser welding head.

9. A laser welding head comprising the laser welding head-controlling system of claim 7, a laser oscillator to oscillate a laser for welding, and a condenser to converge the oscillated laser.

10. A method for controlling the position of a laser welding head with respect to a target area of objects to be welded, comprising the steps of:

emitting at least two linear lasers beams so as to be crisscrossed over a seam line at a predetermined angle toward the target area during or after a welding process to detect a welding state of the target area;

generating an image of the target area exclusively from linear laser beams reflected by the objects passing through a band-pass filter, using a CCD camera provided with the band-filter;

processing the image of the target area to determine the progress of welding; and controlling the position of the laser welding head.

11. The method according to claim 10, further comprising using CAD data of the objects to control the position of the laser welding head.

12. The laser welding head-controlling system according to claim 1, wherein at least one of said semiconductor lasers is on a side of said laser outlet opposite another one of said semiconductor lasers.

13. The laser welding head-controlling system as defined in claim 1, wherein each of said plurality of the semiconductor lasers is configured to direct its linear laser beam at said welding seam or said region already welded so as to be orthogonal to said welding seam or said region.

14. The method for controlling a laser welding head as defined in claim 3, wherein the step of irradiating comprises irradiating each of said plurality of the linear laser beams at a welding seam of said parts so as to be orthogonal to said welding seam.

* * * * *